United States Patent [19]

Hoskin et al.

[11] Patent Number: 4,981,520

[45] Date of Patent: Jan. 1, 1991

[54] OIL RESERVOIR PERMEABILITY PROFILE CONTROL WITH CROSSLINKED WELAN GUM BIOPOLYMERS

[75] Inventors: Dennis H. Hoskin, Lawrenceville; Thomas O. Mitchell, Hopewell Township, Mercer County; Paul Shu, West Windsor, all of N.J.

[73] Assignee: Mobil Oil Corporation, New York, N.Y.

[21] Appl. No.: 283,399

[22] Filed: Dec. 12, 1988

[51] Int. Cl.$^5$ ............................ C08L 5/00; C09K 7/00
[52] U.S. Cl. ...................................... 106/208; 523/130; 527/303; 527/305; 536/114
[58] Field of Search ................ 527/303, 305; 106/205, 106/209; 523/130; 536/114

[56] References Cited

U.S. PATENT DOCUMENTS

| | | | |
|---|---|---|---|
| 3,918,521 | 11/1975 | Snavely, Jr. et al. | 166/272 |
| 4,342,866 | 8/1982 | Kang et al. | 536/119 |
| 4,401,760 | 8/1983 | Peik et al. | 435/101 |
| 4,440,228 | 4/1984 | Swanson | 166/274 |
| 4,479,894 | 10/1984 | Chen et al. | 252/8.55 D |
| 4,489,783 | 12/1984 | Shu | 166/272 |
| 4,565,249 | 1/1986 | Pebdani et al. | 166/303 |
| 4,613,631 | 9/1986 | Espenscheid et al. | 523/130 |
| 4,658,898 | 4/1987 | Paul et al. | 166/270 |
| 4,716,966 | 1/1988 | Shu | 166/295 |
| 4,787,451 | 11/1988 | Mitchell | 166/270 |
| 4,793,416 | 12/1988 | Mitchell | 166/266 |
| 4,834,180 | 5/1988 | Shu | 166/270 |

OTHER PUBLICATIONS

Mobil Docket 4073, Ser. No. 917,324, filed Oct. 9, 1986, which has been allowed.

*Primary Examiner*—Theodore Morris
*Attorney, Agent, or Firm*—Alexander J. McKillop; Charles J. Speciale; Michael J. Mlotkowski

[57] ABSTRACT

A composition capable of selectively plugging highly permeable zones in a subterranean formation. The composition forms a gel subsequent to its injection into the formation via an injection well. The composition comprises an aqueous solution of a welan gum heteropolysaccharide biopolymer produced by the fermentation of a microorganism of the genus Alcaligenes, a phenolic compound, an aldehyde and water. The compositions of this invention will form stable gels even in low salinity brines. Also provided is a process for selectively plugging regions of higher permeability within an oil-bearing subterranean formation to improve sweep efficiency during a fluid flood oil recovery process using the gel-forming compositions of this invention.

10 Claims, No Drawings

OIL RESERVOIR PERMEABILITY PROFILE CONTROL WITH CROSSLINKED WELAN GUM BIOPOLYMERS

FIELD OF THE INVENTION

This invention relates to gel-forming crosslinked compositions which are useful in the control of permeability in subterranean oil-bearing formations. Use of these gels in the oil recovery process of this invention can yield improved sweep efficiency during fluid flooding operations. More particularly, this invention relates to the use of phenolic resins as crosslinking agents for the welan gum-based compositions of this invention.

BACKGROUND OF THE INVENTION

In the production of oil from subterranean formations, it is usually possible to recover only a small fraction of the total oil present in the formation by so-called primary recovery methods which utilize only the natural forces present in the reservoir. To recover oil beyond that which is produced by primary methods, a variety of supplemental production techniques have been employed. In these supplemental techniques, commonly referred to as secondary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of an aqueous or carbon dioxide flooding medium into an oil-bearing formation, either alone or in combination with other fluids. In practice, a number of injection and production wells will be used in a given field arranged in conventional patterns such as a line drive, five spot or inverted five spot, seven spot or inverted seven spot.

In the use of the various flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomenon is known as gravity override.

Also encountered in the use of various flooding techniques is a situation caused by the fact that different regions or strata have different permeabilities. In this situation, the drive fluid preferentially enters the regions of higher permeability due to the lower resistance to flow present rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still-productive sites may be permanently closed.

As a result of these earlier efforts, the desireability of designing a viscous slurry capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "profile" control, a reference to the control of the vertical permeability profile of the reservoir. Profile control agents which have been proposed include oil/water emulsions, gels, e.g., lignosulfate gels and polymers, with polymers being the most extensively applied in recent years.

Of the secondary and tertiary enhanced oil recovery processes, waterflooding, carbon dioxide flooding, miscible or immiscible gas flooding and steam flooding are of particular interest and importance. As indicated, profile control can often improve performance in such processes by reducing the effect of permeability inhomogeneity or stratification and gravity override. A gel suitable for profile control must be stable enough to continue to impede flow for long periods of time at the given temperature, salinity and pH of a particular oil-bearing reservoir. A gel must also have adequate mechanical strength to resist the pressures which will be applied during the subsequent oil recovery flooding step. There are a variety of materials commercially available for profile control, all of which perform differently and have their own, often unique limitations.

Among the many polymers examined thus far are polyacrylamides, polysaccharides, celluloses, furfural-alcohol and acrylic-epoxy resins, silicates and polyisocyanurates. A major part of the work conducted in this area has dealt with polyacrylamides. Polyacrylamides have been used both in their normal, non-crosslinked form as well as in the form of crosslinked metal complexes, as described, for example, in U.S. Pat. Nos. 4,009,755, 4,069,869 and 4,413,680. Shear degradation during injection and sensitivity to reservoir brines tend to diminish the beneficial effects derived from these polyacrylamides.

Proposals have been made for the use of inorganic polymers, especially inorganic silicates, as permeability control agents. For example, U.S. Pat. Nos. 4,009,755 and 4,069,869 disclose the use of inorganic silicates for this purpose. In the permeability control method described in these patents, an organic polymeric permeability control agent such as a crosslinked polyacrylamide or polysaccharide is first injected into the reservoir, followed by an aqueous solution of an alkaline metal silicate and a material that reacts with the silicate to form a silicate gel which plugs the high permeability regions in the formation. An alkaline metal silicate is typically used as the source of silica and the gelling agent is usually an acid or acid-forming compound such as a water soluble ammonium salt, a lower aldehyde, an aluminum salt or an alkaline metal aluminate.

The problem, however, with many inorganic silicates is that their solutions are often quite viscous and stable only under alkaline conditions. As soon as conditions become acidic, a silicate gel is formed. Although this is the desired reaction for plugging the formation, it may occur prematurely. For example, gelation may begin before the solution has had an adequate opportunity to enter the high permeability regions of the formation, cutting off the possibilities for further injection of plugging material.

Other attempts have been made to achieve profile control. One such attempt is described in U.S. Pat. No. 4,498,539 to Bruning, which discloses delayed gelable compositions for injection of a water thickening amount of a polymer capable of gelling in the presence of a crosslinking agent so that after the composition has penetrated into an underground formation and positioned itself preferentially in the highly permeable strata, the delayed gelation is triggered by in-situ hydrolysis of an ester which reduces the pH of the composition to the gelable range thereby producing in-depth plugging of the strata with the gelled polymer.

Another group of polymeric thickeners which has received considerable attention for use in waterflooding is xanthan polysaccharides. Xanthan polysaccharides are produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides. U.S. Pat. Nos. 4,078,607 and 4,104,193 describe a method for improving the efficiency of waterflooding operations by a particular polysaccharide prehydration technique. U.S. Pat. No. 4,413,680 describes the use of crosslinked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for crosslinking xanthan polysaccharides and other polymers which are to be used for permeability control is described in U.S. Pat. Nos. 4,009,755, 4,069,869 and 4,413,680. The use of phenol/aldehyde crosslinking agents with xanthan polysaccharides and other polymers is disclosed in U.S. Pat. Nos. 4,323,123 and 4,440,228.

Another type of polysaccharide which has been experimented with in the area of profile control is the non-xanthan, heteropolysaccharide S-130. S-130 belongs to the group of non-xanthan welan gums. S-130 is produced by fermentation with a microorganism of the genus Alcaligenes. Another welan gum heteropolysaccharide, known as S-194, is also produced by fermentation with a microorganism of the genus Alcaligenes. A notable characteristic of the heteropolysaccharide S-130 is that it develops a high viscosity in saline waters. This is particularly so in brines which contain divalent cations such as $Ca^{2+}$ and $Mg^{2+}$ or monovalent cations such as $Na+$ and $K+$.

U.S. Pat. No. 4,658,898 discloses the use of welan gum S-130 in saline waters. Crosslinking with trivalent cations, such as chromium, aluminum, zirconium and iron is also disclosed. Additionally, crosslinking with organic compounds containing at least two positively charged nitrogen atoms is disclosed in U.S. Pat. No. 4,658,898, which is hereby incorporated by reference in its entirety.

Ser. No. 940,682 filed Dec. 11, 1986, now U.S. Pat. No. 4,787,451 the inventor of which is also a co-inventor of the present invention, discloses the use of melamine-formaldehyde and other amino resins to crosslink various polymers including the welan gum heteropolysaccharide S-130. Ser. No. 940,682 is hereby incorporated by reference in its entirety.

One problem which has continually attended the use of organic polymers as profile control agents is that of stability in the reservoir. This requires not only that the gel formed by the polymer should be stable enough to withstand the relatively high temperatures encountered in some reservoirs -in itself, a difficult requirement - but also that the gel should be stable over as wide a range of pH conditions as possible so that the polymer will have the potential of being used in reservoirs of different kinds, e.g. sandstone, carbonate rock and others. Stability to various oilfield brines is another desirable requirement. Many of the known types of organic gel forming polymers are unsatisfactory in one respect or another, e.g. temperature stability, brine stability, pH range, so that there has been a continuing need for new and different polymers for permeability control purposes.

While the welan gum heteropolysaccharide S-130 will gel in the presence of high salinity brines, in lower salinity or softer brines it will not gel.

Accordingly, it is an object of the present invention to provide an improved aqueous crosslinked gel of a welan gum heteropolysaccharide and phenolic resin or phenol/aldehyde mixture which is useful in a lower salinity oil-bearing reservoir environment.

It is another object of this invention to provide a substantially more stable gel for use when high temperatures are encountered.

It is a further object of this invention to provide a process for selectively plugging regions of higher permeability within an oil-bearing subterrranean formation to obtain improved sweep efficiency during a fluid flood oil recovery operation.

SUMMARY OF THE INVENTION

According to the present invention, there is provided a process for controlling the permeability of subterranean, oil-bearing formations. A welan gum heteropolysaccharide biopolymer is produced by the aerobic fermentation of bacteria of the genus Alcaligenes, and when crosslinked with phenolic resins or mixtures of phenol and aldehyde compounds, forms a gel under conditions of lower salinity. Such a gel is useful in waterflooding and carbon dioxide flooding oil recovery operations where improved sweep efficiency is desired. For example, a gel-forming composition of this invention may be injected into a region of higher permeability within an oil-bearing subterranean formation to selectively plug this more permeable region and thus improve the sweep efficiency of a subsequent fluid flooding operation.

The welan gum heteropolysaccharide biopolymer is present in the aqueous crosslinked gel composition in an amount of about 0.1 to about 5.0 weight percent.

The phenolic resin component of the novel gel of this invention may be present in an amount of about 0.02 to about 5.0 weight percent, this amount being sufficient to cause gelation of an aqueous dispersion of the welan gum biopolymer. When, instead of a phenolic resin, separate aldehyde and phenol compounds are utilized, these will be present in gel-forming amounts of from about 0.01 to about 3.0 weight percent, and from about 0.01 to about 2.0 weight percent, respectively.

DESCRIPTION OF THE PREFERRED EMBODIMENTS

The aqueous crosslinked gel compositions and the process for selectively plugging regions of higher permeability within oil-bearing formations according to the present invention can be used in conjunction with those flooding operations in which a flooding fluid, usually water or carbon dioxide, is injected into a formation through injection wells which extend from the surface of the earth into the formation. The polymer which is used in the present invention is a non-xanthan, welan gum heteropolysaccharide such as S-130. The polysaccharide S-130 is produced by the aerobic fermentation of suitable aqueous nutrient media with an organism of the Alcaligenes species, identified as ATCC 31555 (American Type Culture Collection, Accession No. ATCC 31555, unrestricted permanent deposit made Aug. 27, 1979). The polymer produced by the fermentation of carbohydrate sources of assimilable carbon in the presence of the microorganism is composed principally of carbohydrate, with a small quantity of O-acyl groups. The carbohydrate portion of the polysaccharide contains glucuronic acid and the neutral sugars mannose, glucose and rhamnose in an approximate molar ratio of 1:2:2. The ratio of terminally linked rhamnose to 1,4-linked rhamnose is 1:2, with the glucose being principally 1,3-linked.

Welan gum polysaccharide S-130, its characteristic properties, its method of production and the characteristics of the microorganism used in the fermentation are described in greater detail in U.S. Pat. No. 4,342,866, to which reference is made for such details. The polysaccharide is available commercially from the Kelco Oil Field Group, division of Merck and Co. Inc.

A key property of the heteropolysaccharide S-130 is the fact that it produces high viscosity aqueous solutions which exhibit superior viscosity retention at high temperatures as well as desirable shear-thinning characteristics. Available data indicate that S-130 maintains at least half its room temperature viscosity at a temperature of 300° F. (about 150° C.) and that the viscosity is stable for relatively long periods at high temperatures. The solutions are highly shear thinning; that is, viscosity decreases with increasing shear rate and immediately reverts back to a higher viscosity when shear is reduced. This property enables it to be effectively placed in high permeability portions of subterranean formations so that, when shear is reduced, a highly viscous gel will be formed to block these regions selectively. However, the high degree of shear thinning which this polymer exhibits also indicates that in certain instances, care may have to be taken in placing it in the formation. Because non-crosslinked solutions of the polymer become almost water-thin at high shear rates, there is a possibility that under these conditions the solution may be capable of entering the less highly permeable regions of the formation where it would plug them when the gel is re-formed. To prevent this from happening, it may be desirable to identify the more highly permeable strata and to inject the polymer solution into these regions alone by the use of suitable packers in the injection well.

The stability of the welan gum biopolymers at relatively high temperatures, particularly above 150° or 165° F., is particularly useful in the present application since it enables the biopolymers to be used in high temperature reservoirs, e.g. those with temperatures up to 200° F. or even higher without risk of excessive degradation induced by the reservoir temperature. Also, the gels formed by the compositions of the present invention are not so hard as to present the possibility of damage to the reservoir, but are stiff enough to resist pressure during liquid flooding.

S-130 polysaccharide, if available as a dry powder, may be hydrated by being mixed into water with suitable agitation to prevent the formation of lumps. High shear polymer mixers or eductors or jet hoppers may be used for mixing. If hydration is delayed, increasing the mixing shear, raising the fluid temperature or both may help overcome delays. If lumps tend to form, an initial slurry of the powder in a non-aqueous solvent such as isopropanol may be prepared and the slurry poured into water with agitation, to form a lump-free, viscous solution.

In the practice of this invention, a pre-formed phenolic resin can be used; said resin is generally obtained by the condensation of phenol or substituted phenols with an aldehyde such as formaldehyde, acetaldehyde and furfural. Additionally, the phenol and aldehyde constituents can be added separately to produce the compositions of this invention, rather than being added as a pre-formed phenolic resin.

Any suitable water-dispersible phenol can be used in the practice of this invention. Phenolic compounds suitable for use in the present invention include phenol, resorcinol, catechol, 4,4'-diphenol, 1,3-dihydroxynaphthalene, pyrogallol, phloroglucinol and other similar compounds. Resorcinol and phenol are the preferred phenolics for most water and carbon dioxide drive applications, with resorcinol being particularly preferred. The choice of a phenol compound will be based largely on the rate of gelation desired. Mixtures of the named phenols are also useful.

A broad range of water-dispersible aldehydes are useful in the practice of the present invention. It is known that both aliphatic and aromatic monoaldehydes and dialdehydes can be used. The useful aliphatic monoaldehydes include those containing from one to ten carbon atoms per molecule, such as formaldehyde, paraformaldehyde, acetaldehyde, proprionaldehyde, butylaldehyde, isobutylaldehyde, heptaldehyde and others. Among the useful dialdehydes are glyoxal, glutaraldehyde and terephthaldehyde. Mixtures of the various, aforementioned aldehydes are also useful in the practice of the present invention. Of the preferred aldehyde compounds, formaldehyde is particularly preferred.

The amount of the welan gum biopolymer useful in preparing the aqueous crosslinked gels of this invention may vary depending on the particular biopolymer used, its purity and the desired properties of the resultant gels. Generally speaking, the quantity of the welan gum biopolymer used will be a water-thickening or viscosifying amount, that is, an amount which will significantly increase the viscosity of the water to which it has been added. Amounts ranging from about 0.1 to about 5.0 weight percent are preferred; with amounts ranging from about 0.2 to about 2.0 weight percent particularly preferred.

The amount of phenolic resin or aldehyde and phenol mixture useful in the practice of this invention will generally be a small but effective amount sufficient to initiate and cause gelation of an aqueous solution of the welan gum biopolymer. It will generally be found that the amount of phenolic resin useful to form advantageous gels will be in the range of 0.02 to 5.0 weight percent. When preformed resin is not employed, the amount of the phenol compound used will be in the range of 0.01 to about 2.0 weight percent, with concentrations of 0.05 to 1.0 weight percent preferred. The concentration of aldehyde used will be in the range of 0.01 to 3.0 weight percent, with concentrations of 0.1 to 1.0 weight percent preferred.

These gels are novel in that they will form in the lower salinity brines often encountered in oil reservoirs. High temperatures encountered in some oil-bearing formations do not adversely affect these gels. The carbonate, bicarbonate and sulfate anions often encountered in oil reservoirs which are known to adversely affect some metal cross-linked gels do not affect these novel, organically-crosslinked gels. These novel gels can be formed under virtually all pH conditions. Additionally, these crosslinked welan gum biopolymer gels are able to withstand the conditions encountered in flooding operations where either water or $CO_2$ are utilized as the drive fluid.

The following data demonstrate the extent of the unexpected beneficial results obtained with the crosslinked welan gum biopolymer gels of the present invention. The invention is illustrated by the following non-limiting examples:

EXAMPLES 1–14

The anionic heteropolysaccharide S-130, produced by the Kelco Oil Field Group of Merck and Co., Inc., in powder form, was dispersed in a 6% total dissolved solids (TDS) brine at the desired concentration of 3500 ppm by high speed mixing in a suitable blender for about 20 minutes. The resultant dispersion was than buffered to $CO_2$-flooding pH conditions (pH=4) with 2000 ppm of potassium hydrogen phthalate. As shown in Table 1, samples were prepared for evaluation of the resultant gels using various combinations of resorcinol (250 to 1000 ppm) and formaldehyde (500 to 2700 ppm) and stored at 140° F. After 5 weeks of such storage, all gels were judged to be good, with no evidence of syneresis observed. Storage generally continued until the gel broke up, syneresis exceeded 20% or at 26 weeks, whichever occurred first. Note that 20% syneresis indicates that 80% of the original gel volume is occupied by gel and 20% by expelled water. 20% syneresis was an arbitrarily selected criterion for termination of the test and is not indicative of unsuitability of the gel.

TABLE 1

Gel Stability at 140° F., 6% Brine and pH = 4
Buffered with 2000 ppm Potassium Hydrogen Phthalate

| Ex. | Welan Gum Conc., ppm | Resorcinol Conc., ppm | Formaldehyde Conc., ppm | Test Duration, Weeks | Syneresis At Test Completion, % |
|---|---|---|---|---|---|
| 1 | 3500 | 250 | 500 | 8 | 0 |
| 2 | 3500 | 250 | 1000 | 15 | 10 |
| 3 | 3500 | 250 | 1850 | 15 | 10 |
| 4 | 3500 | 250 | 2700 | 15 | 5 |
| 5 | 3500 | 500 | 500 | 8 | 0 |
| 6 | 3500 | 500 | 1000 | 15 | 10 |
| 7 | 3500 | 500 | 1850 | 8 | 0 |
| 8 | 3500 | 500 | 1850 | 15 | 5 |
| 9 | 3500 | 500 | 1850 | 15 | 10 |
| 10 | 3500 | 500 | 2700 | 26 | 10 |
| 11 | 3500 | 750 | 1000 | 15 | 5 |
| 12 | 3500 | 750 | 1850 | 15 | 10 |
| 13 | 3500 | 750 | 2700 | 15 | 10 |
| 14 | 3500 | 1000 | 1850 | 26 | 35 |

EXAMPLES 15–32

Welan gum heteropolysaccharide S-130 was dispersed as before in the various brines identified in the tables below. A full matrix of samples of 3500 ppm S-130, 1000 ppm resorcinol and 1850 ppm formaldehyde were prepared in synthetic sea water (3% salinity) and 6, 12 and 23% brines (90% NaCl and 10% $CaCl_2$). Various pH levels were used, ranging from 3.5 to 7.0. The samples prepared were stored for evaluation at 140°, 175° and 210° F. Results are presented in Tables 2–4, respectively.

TABLE 2

Gel Stability at 140° F.
Each Gel Contains:
1000 ppm Resorcinol and 1850 ppm Formaldehyde.

| Ex. | Welan Gum Conc., ppm | pH | Salinity, % TDS | Test Duration, Weeks | Syneresis At Test Completion, % |
|---|---|---|---|---|---|
| 15 | 3500 | 3.5 | Sea Water | 26 | 5 |
| 16 | 3500 | 3.5 | 6 | 26 | 35 |
| 17 | 3500 | 3.5 | 12 | 26 | 22 |
| 18 | 3500 | 3.5 | 23 | 3 | 30 |

TABLE 3

Gel Stability at 175° F.
Each Gel Contains:
1000 ppm Resorcinol and 1850 ppm Formaldehyde.

| Ex. | Welan Gum Conc., ppm | pH | Salinity, % TDS | Test Duration, Weeks | Syneresis At Test Completion, % |
|---|---|---|---|---|---|
| 19 | 3500 | 3.5 | Sea Water | 10 | 14 |
| 20 | 3500 | 3.5 | 6 | 10 | 20 |
| 21 | 3500 | 3.5 | 12 | 10 | 25 |
| 22 | 3500 | 3.5 | 23 | 4 | 45 |
| 23 | 5000 | 5.5 | 12 | 26 | 15 |
| 24 | 3500 | 7.0 | Sea Water | 26 | 15 |
| 25 | 3500 | 7.0 | 6 | 26 | 15 |
| 26 | 3500 | 7.0 | 12 | 26 | 18 |
| 27 | 3500 | 7.0 | 23 | 26 | 35 |

TABLE 4

Gel Stability at 210° F.
Each Gel Contains:
1000 ppm Resorcinol and 1850 ppm Formaldehyde.

| Ex. | Welan Gum Conc., ppm | pH | Salinity, % TDS | Test Duration, Weeks | Syneresis At Test Completion, % |
|---|---|---|---|---|---|
| 28 | 5000 | 6.0 | Sea Water | 4* | 0 |
| 29 | 3500 | 7.0 | Sea Water | 18* | 25 |
| 30 | 3500 | 7.0 | 6 | 18* | 25 |
| 31 | 3500 | 7.0 | 12 | 18* | 25 |
| 32 | 3500 | 7.0 | 23 | 6* | 35 |

*Test discontinued voluntarily

As shown above, results indicate resorcinol/formaldehyde can be used to make good welan gum gels even in sea water. Observations made after 5 weeks (data not presented above) indicated that samples at pH 7 had little or no syneresis at 175° F. or minor syneresis at 210° F., except for the samples in 23% brine which syneresed badly from over crosslinking (they would gel in 23% brine without the resin). Gels at pH 3.5 and 175° F. were firmer than those at pH 7.0 and again showed significant syneresis only in 23% brine. As with Examples 1-14, tests generally continued until the gel broke up, syneresis exceeded 20% or at 26 weeks, whichever occured first.

Where it is desired to obtain increased sweep efficiency, gels of this invention can be used to plug a previously swept portion of a formation. These gels can be directed to areas of increased porosity by utilization in any of the below methods, as well as others which those skilled in the art will plainly recognize. Additionally, the permeability control treatment may be carried out periodically when necessary to achieve the desired permeability profile.

One method where gels of this invention can be utilized is during a waterflooding process for the recovery of oil from a subterranean formation. After plugging the more permeable zones of a reservoir with the novel gels of this invention, a waterflooding process can be commenced or resumed. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a carbon dioxide flooding process, either alone, or in conjunction with a cyclical steam stimulation in a heavy oil recovery process to obtain greater sweep efficiency. Cyclic carbon dioxide steam stimulation can be commenced or resumed after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process for recovering oil. Prior to commencement or resumption of the carbon dioxide process, the more permeable zones are plugged with these novel gels.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. An aqueous crosslinked biopolymer gel comprising:
   (a) water;
   (b) a viscosifying amount of a welan gum heteropolysaccharide biopolymer produced by fermentation with a microorganism of the genus Alcaligenes;
   (c) about 0.01 to about 2.0 weight percent of at least one phenolic compound selected from the group consisting of phenol, resorcinol, catechol, phloroglucinol, pyrogallol, 4,4'-diphenol and 1,3-dihydroxynaphthalene; and
   (d) about 0.01 to about 3.0 weight percent of at least one aldehyde component selected from the group consisting of aliphatic monoaldehydes, aromatic monoaldehydes, aliphatic dialdehydes and aromatic dialdehydes, which amounts of said phenolic compound and said aldehyde component are sufficient to cause gelation of the aqueous solution of said biopolymer and produce the crosslinked polymer gel.

2. The composition of claim 1, wherein said welan gum biopolymer is heteropolysaccharide S-130.

3. The composition of claim 1, wherein said aldehyde compound is formaldehyde and said phenolic compound is resorcinol.

4. The composition of claims 1, 2 or 3, wherein said welan gum biopolymer is present in an amount ranging from about 0.1 to about 5.0 weight percent.

5. The composition of claims 1, 2, or 3, wherein said water is a low-salinity brine.

6. The composition of claim 4, wherein said water is a low-salinity brine.

7. The composition of claims 1, 2, or 3, wherein said phenolic compound and said aldehyde compound are condensed to form a phenolic resin.

8. The composition of claim 4, wherein said phenolic compound and said aldehyde compound are condensed to form a phenolic resin.

9. The composition of claim 5, wherein said phenolic compound and said aldehyde compound are condensed to form a phenolic resin.

10. The composition of claim 6, wherein said phenolic compound and said aldehyde compound are condensed to form a phenolic resin.

* * * * *